United States Patent
Bacardit

(10) Patent No.: US 7,077,050 B2
(45) Date of Patent: Jul. 18, 2006

(54) PNEUMATIC BRAKE BOOSTER, PARTICULARLY FOR A MOTOR VEHICLE

(75) Inventor: Juan Simon Bacardit, Barcelone (ES)

(73) Assignee: Robert Bosch GmbH, Stuttgart (DE)

( * ) Notice: Subject to any disclaimer, the term of this patent is extended or adjusted under 35 U.S.C. 154(b) by 106 days.

(21) Appl. No.: 10/959,649

(22) Filed: Oct. 6, 2004

(65) Prior Publication Data

US 2006/0070519 A1 Apr. 6, 2006

(30) Foreign Application Priority Data

Oct. 6, 2003 (FR) .................................. 03 11694

(51) Int. Cl.
*F15B 9/10* (2006.01)

(52) U.S. Cl. ...................................... 91/369.2; 60/329
(58) Field of Classification Search ............... 91/369.2, 91/369.3, 376 R; 60/329
See application file for complete search history.

(56) References Cited

U.S. PATENT DOCUMENTS 6,135,007 A * 10/2000 Tsubouchi ................. 91/369.2

\* cited by examiner

*Primary Examiner*—Edward K. Look
*Assistant Examiner*—Michael Leslie
(74) *Attorney, Agent, or Firm*—Leo H. McCormick; Sarah Taylor

(57) ABSTRACT

Pneumatic brake booster, in particular for a motor vehicle, comprising a reaction disk (30) interposed between a plunger (28) carried by a control rod actuated by the brake pedal and a thrust rod (32) acting on the primary piston of a tandem master cylinder, the reaction disk (30) being housed inside an annular metal part (36) which cooperates with a stop (50) of the thrust rod (32) by the intermediary of thermal expansion element (48) designed to compensate for the thermal expansion of the reaction disk (30) and its effect on a point of change of assistance ratio.

10 Claims, 2 Drawing Sheets

PNEUMATIC BRAKE BOOSTER, PARTICULARLY FOR A MOTOR VEHICLE

The invention relates to a pneumatic brake booster, in particular for a motor vehicle.

The braking circuit of a motor vehicle generally comprises a pneumatic assistance booster which is fitted between a control rod actuated by the brake pedal and a tandem master cylinder fitted in a hydraulic circuit for feeding the brakes of the vehicle.

The booster comprises, in a conventional manner, a rigid casing divided into a vacuum chamber and a working chamber by a fluid-tight membrane which carries an axial piston interposed between the control rod connected to the brake pedal and a thrust rod acting on the primary piston of the tandem master cylinder.

A reaction disk made of substantially incompressible material such as rubber or an elastomer is mounted in a basin at the end of the thrust rod and is applied against the axial piston of the booster and against a plunger which is mounted at the end of the control rod and which is guided in translation in an axial passage of the piston of the booster.

The assistance ratio provided by the booster depends on the areas of application of the forces applied on the reaction disk, on one side by the piston of the booster and by the plunger and, on the other side, by the thrust rod.

Means have already been proposed making it possible to increase the assistance ratio in the case of emergency braking, these means comprising an elastically deformable capsule made, for example, of spring steel inside of which the reaction disk is mounted. The capsule is mounted in an axially sliding manner on the end of the thrust rod which comprises a shoulder intended to bear on an end of the capsule after elimination of an axial play, in emergency braking.

During normal braking, the reaction force of the braking circuit is transmitted by the end of the thrust rod which slides in a cylindrical end of the capsule and which is applied directly onto the reacting disk, the assistance ratio then being determined by the radial surface of the end to the thrust rod.

During emergency braking, the axial play between the shoulder of the thrust rod and the capsule is eliminated and the reaction force of the braking circuit is no longer transmitted by the end of the thrust rod but by the whole of the radial surface of the capsule which is greater than the radial surface of the end of the thrust rod, which increases the assistance ratio.

In this known system, it is the radial play between the shoulder of the thrust rod and the end of the capsule which determines the point of change of assistance ratio.

It has been observed that this point could change as a function of the operating temperature of the booster because the thermal expansion of the reaction disk had a non-negligible effect on the said axial play, which increased at the same time as the operating temperature.

The object of the present invention is, in particular, to provide a simple, effective and inexpensive solution to this problem.

The subject of the invention is a pneumatic assistance booster of the said type, which comprises means of modification of the assistance ratio in the case of emergency braking, whose sensitivity to variations in operating temperature is zero or at least very much lower than that of the boosters of the prior art.

For this purpose, it proposes a pneumatic brake booster, in particular for a motor vehicle, comprising an axial piston bearing on a thrust rod by the intermediary of a reaction disk made of substantially incompressible material and carried by the thrust rod, this reaction disk also cooperating with a plunger mounted at the end of a control rod and which is guided in a sliding manner in an axial passage of the piston, characterized in that the thrust rod carries an axial thermal expansion element mounted between a stop integral with the thrust rod and a bearing element on the reaction disk, with an axial play between the thermal expansion element, the bearing element, the stop of the thrust rod and the reaction disk, this axial play determining a point of change of assistance ratio, the said thermal expansion element having on this axial play, during variations in the operating temperature, an effect opposite to that of the reaction disk.

In the booster according to the invention, the thermal expansion of the element carried by the thrust rod makes it possible to compensate, at least partially, for the thermal expansion of the reaction disk, such that the effects of variations in the operating temperature of the booster on the point of change of assistance ratio are substantially cancelled out or at least very significantly reduced.

The functioning of the booster in emergency braking is thus made less sensitive to temperature variations.

Furthermore, the means making it possible to obtain this result are applicable without difficulty and inexpensively to preexisting boosters.

According to another feature of the invention, the thermal expansion element cooperates by bearing against an annular metal part carried by the thrust rod and containing the reaction disk.

This annular part is mounted in an axially sliding manner on the thrust rod and comprises a cylindrical end which has a diameter less than that of the reaction disk and which is guided in axial translation over a corresponding end of the thrust rod which extends through this cylindrical end of the annular part and which bears against the reaction disk.

In a first embodiment of the invention, the thermal expansion element is tubular and externally surrounds the thrust rod.

In this case, the thermal expansion element bears against the annular part which contains the reaction disk.

In another embodiment of the invention, the thermal expansion element is mounted inside a tubular part of the thrust rod and is traversed axially by a finger integral with the thrust rod and which bears against the reaction disk.

In this embodiment, the bearing element associated with the expansion element is mounted around the said finger between the expansion element and the annular part and is formed from a cylindrical ring of which one end bears against the thermal expansion element and of which the other end carries a radial flange applied against the cylindrical end of the annular part containing the reaction disk.

In these two embodiments, the thermal expansion element is made from a material having an appropriate coefficient of thermal expansion, more or less corresponding to that of the reaction disk, and its axial dimensions are determined such that its axial thermal expansion at least approximately balances that of the reaction disk over a very wide range of temperatures which is for example approximately from −40° C. to +120° C.

The invention will be better understood and other features, details and advantages will appear more clearly on reading the following description, given by way of example and with reference to the appended drawings in which.

By convention, in the following description, that which is located on the left of the drawings will be described as being at the front, and that which is located on the right will be described as being at the rear.

Figure 1:
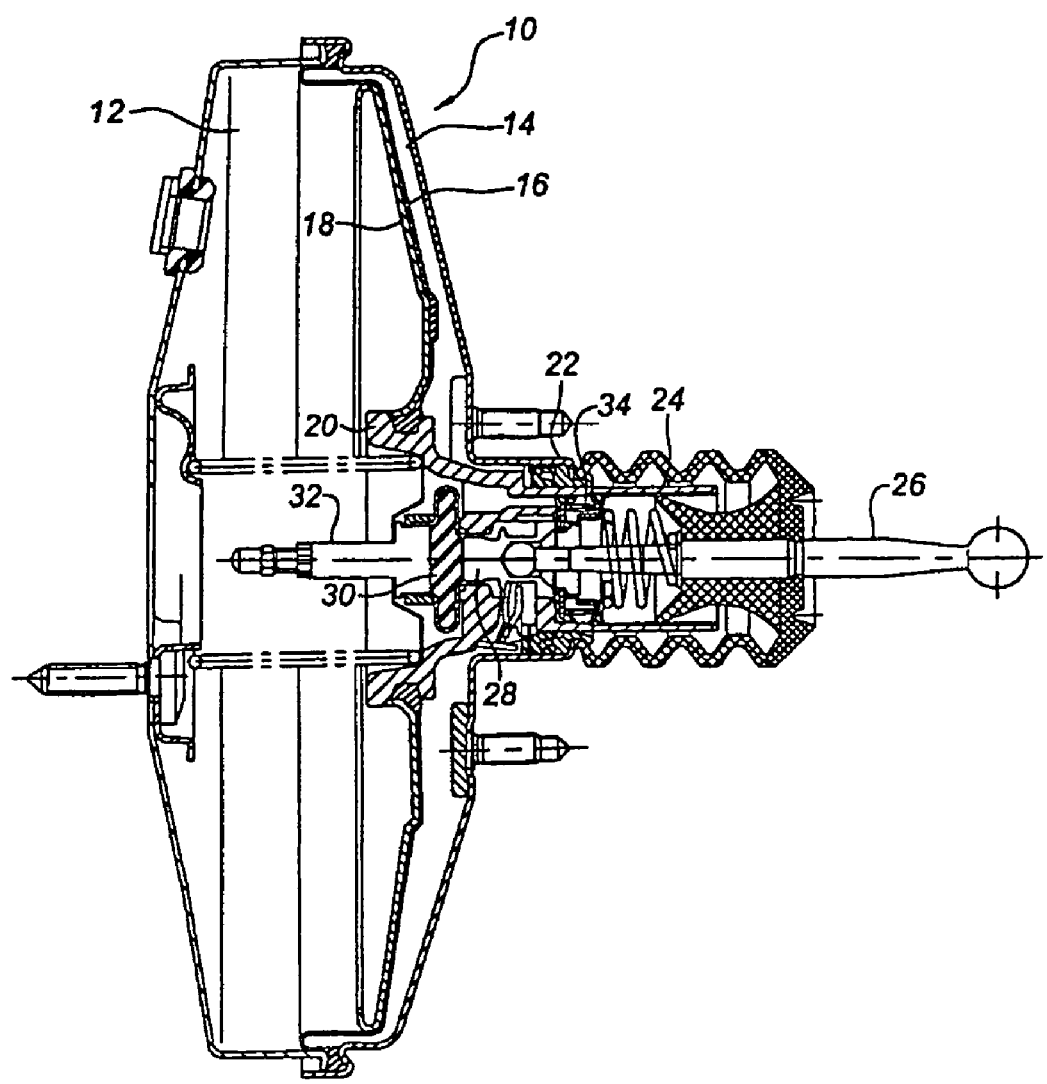
FIG. 1 is a diagrammatic view in axial cross-section of a booster according to the invention.

Reference is firstly made to FIG. 1 which is a diagrammatic representation in axial cross-section of a pneumatic assistance booster of a braking circuit for a motor vehicle.

This booster comprises a casing 10 whose inside volume is divided into a front chamber 12, or vacuum chamber, and a rear chamber 14, or working chamber, by a flexible and fluid-tight membrane 16, for example made of rubber, elastomer or similar, which rests on a rigid skirt 18 and which is fixed at its outer periphery to the casing 10.

The inner periphery of the membrane 16 is fixed with the inner periphery of the skirt 18 to an axial piston 20 guided in axial translation in a cylindrical neck 22 which extends towards the rear from the casing 10.

A tubular section 24 at the rear end of the piston 20 extends outside of the neck and receives a control rod 26 which is guided in axial translation inside the piston and which is connected at its rear end to a brake pedal which is not shown, whilst its front end carries a plunger 28 guided in axial translation with respect to the piston 20. The plunger 28 is intended to come to bear against a reaction disk 30 made of substantially incompressible material, for example of rubber or of elastomer, which is mounted at the end of an axial thrust rod 32 cooperating with the primary piston of a tandem master cylinder which is not shown forming part of a hydraulic circuit for feeding the brakes of the vehicle with brake fluid under pressure.

In a known way, the front chamber 12 of the booster 10 is connected to a vacuum source, such as for example the inlet manifold of the motor vehicle, whilst the rear chamber 14 is connected either to the front chamber 12 in the rest state or is progressively supplied with air at ambient pressure during a braking operation.

A three-way valve 34 is fitted inside the tubular section 24 of the piston 20 and is actuated by the control rod 26 in order, during a braking operation, firstly to close the connection between the two chambers 12 and 14 and then to progressively open a connecting passage between the rear chamber 14 and the ambient atmosphere.

Figure 2:
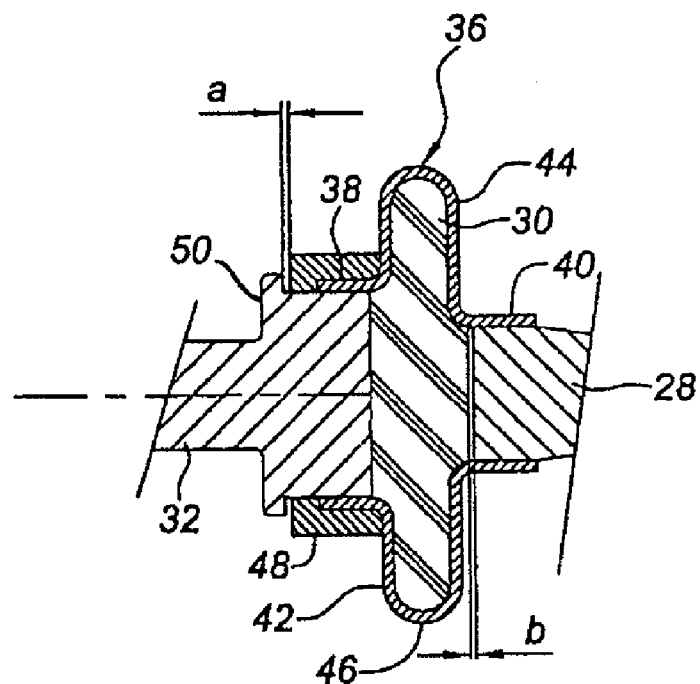
FIG. 2 is a partial diagrammatic view in axial cross-section at a bigger scale, showing the end of the thrust rod, the annular part containing the reaction disk and the end of the plunger carried by the control rod.

In the booster according to the invention, and as will be better seen in FIG. 2, the reaction disk 30 is housed inside an elastically deformable annular part 36 made, for example, from spring steel, of which a cylindrical front end 38 is mounted in an axially sliding manner on the end of the thrust rod 32 and of which a rear cylindrical end 40 forms an axial translation guidance for the front end of the plunger 28 carried by the control rod 26.

The annular part 36 furthermore comprises a front radial face 42 which is connected to the front cylindrical end 38 and a rear radial face 44 which is connected to the rear cylindrical end 40. These two radial faces 42 and 44 are connected by a peripheral wall 46 of rounded shape whose concavity faces inwards. As seen well in FIG. 2, the space delimited by the radial faces 42 and 44 and the cylindrical surface 46 of the annular part 36 is entirely filled by the reaction disk 30. The rear end of the thrust rod 32 and the front end of the plunger 28 guided in translation in the cylindrical ends 38 and 40 respectively of the annular part 36 can bear directly on radial faces of the reaction disk 30.

A tubular thermal expansion element 48 is fitted around the rear cylindrical end of the thrust rod 32, between a stop 50 formed by a shoulder of the thrust rod 32 and the front radial face 42 of the annular part 36 with, in the rest state, an axial play a between the stop 50, the thermal expansion element 48 and the front radial face 42 of the annular part 36.

In a known way, another axial play b exists in the rest state between the front end of the plunger 28 and the reaction disk 30.

The thermal expansion element 48 is made from a rigid material having a coefficient of thermal expansion in the axial direction making it possible to compensate for the axial thermal expansion of the reaction disk 30 during variations in the operating temperature of the booster.

In fact, when the reaction disk 30 expands axially as a result of a rise in the ambient temperature, it bears against the rear end of the thrust rod 32, and tends to move the rear radial face 44 of the annular part 36 towards the rear, which has the effect of increasing the distance between the stop 50 of the thrust rod 32 and the front cylindrical end 38 of the annular part 36, and therefore of increasing the said axial play a.

The axial thermal expansion of the element 48 has an opposite effect on this axial play a since the increase in the axial length of the element 48 caused by an increase in temperature has the effect of reducing the axial play a. The sum of the reduction and of the increase in the axial play a due to the increases in axial length of the element 48 and of the reaction disk 30 can therefore be substantially zero when the dimensional and thermal expansion characteristics of the element 48 are chosen correctly.

In operation, during normal braking, the reaction of the hydraulic circuit is transmitted to the reaction disk 30 by the rear end of the thrust rod 32 and this reaction is transmitted by the disk 30 to the plunger 28 which is applied against the reaction disk, the play b being eliminated.

During emergency braking, the shoulder 50 of the thrust rod 32 comes to bear against the end of the element 48 which is itself bearing on the front radial face 42 of the annular part 36 containing the reaction disk, and the reaction of the hydraulic braking circuit is applied to the reaction disk over the biggest radial surface of the annular part 36. This results in an increase in the assistance ratio.

The axial play a being maintained substantially constant during variations in the operating temperature, the change of assistance ratio always occurs in the same braking conditions.

Figure 3:
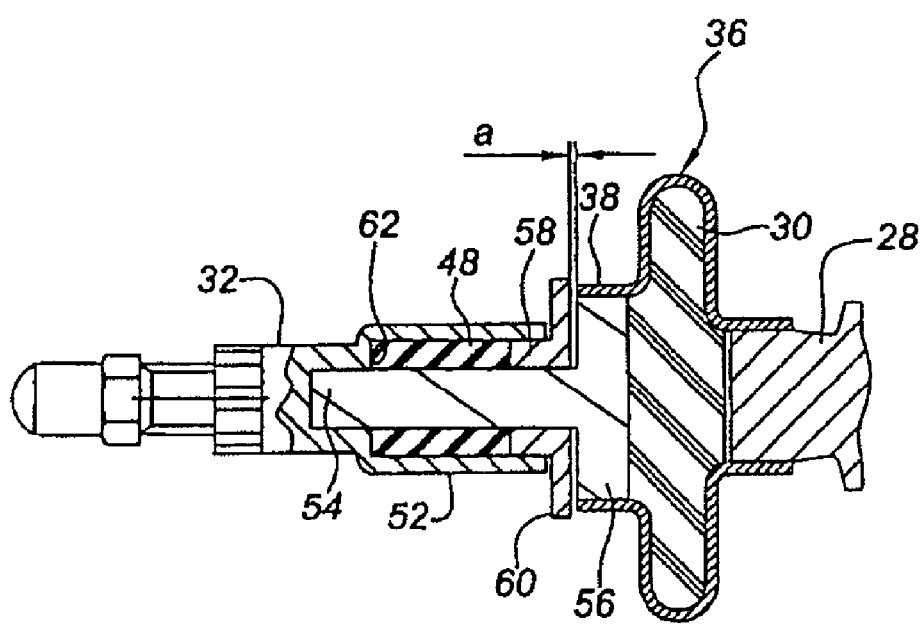
FIG. 3 is a view corresponding to FIG. 2 and showing a variant embodiment of the invention.

In a variant embodiment, shown diagrammatically in FIG. 3, the tubular thermal expansion element 48 is housed in a rear end tubular part 52 of the thrust rod 32 and is traversed axially by a cylindrical finger 54 integral with the thrust rod, this finger 54 ending in a thrust pad 56 applied against the reaction disk 30, this thrust pad 56 being guided in axial translation in the front cylindrical end 38 of the annular part 36 containing the reaction disk.

A bearing element formed by a cylindrical ring 58 is mounted inside the tubular end 52 of the thrust rod, between the thermal expansion element 48 and the front cylindrical end 38 of the annular part 36, this ring 58 comprising at its rear end a radial flange 60 whose outside diameter is slightly greater than that of the front cylindrical end 38 of the part 36.

The said axial play a is formed between the front face of the cylindrical end 38 of the part 36, the radial flange 60 of the ring 58, the thermal expansion element 48 and the extremity 62 of the tubular part 52 of the thrust rod 32 which receives the thermal expansion element 48.

In this embodiment, as the thermal expansion element 48 is enclosed in a closed space, this element can be formed from the same substantially incompressible material as the reaction disk 30.

In operation, during normal braking, the reaction of the hydraulic circuit is transmitted to the reaction disk 30 by the rear end pad 56 of the finger 54. During emergency braking, the radial flange 60 of the bearing element 58 is applied against the front cylindrical end 38 of the annular part 36 and the reaction of the hydraulic circuit is applied to the reaction disk 30 by the surface of bigger diameter of the annular part 36.

The variations in the operating temperature have effects on the reaction disk 30 and on the element 48 which compensate each other and approximately cancel each other out at the level of the axial play a.

As already mentioned, the fact that the thermal expansion element 48 is entirely contained in a closed space makes it possible to use a substantially incompressible material for this element, such as rubber, an elastomer or similar, which can be identical or similar to that of the reaction disk.

What is claimed:

1. A pneumatic brake booster, for a motor vehicle, comprising an axial piston (20) bearing on a thrust rod (32) by an intermediary of a reaction disk (30) made of substantially incompressible material and carried by the thrust rod, said reaction disk cooperating with a plunger (28) mounted at the end of a control rod (26) and guided in a sliding manner in an axial passage of the piston (20), characterized in that the thrust rod (32) carries an axial thermal expansion element (48) mounted between a stop (50, 62) integral with the thrust rod (32) and a bearing element (58, 42) on the reaction disk (30), with an axial play (a) between the thermal expansion element (48), the bearing element (58, 42), the stop (50, 62) of the thrust rod and the reaction disk (30), said axial play determining a point of change of assistance ratio, said thermal expansion element (48) having on this axial play, during variations in the operating temperature, an effect opposite to that of the reaction disk (30).

2. The booster according to claim 1, characterized in that the thermal expansion element (48) cooperates by bearing against an annular part (36) carried by the thrust rod and containing the reaction disk (30).

3. The booster according to claim 2, characterized in that the annular part (36) slides axially over the thrust rod (32).

4. The booster according to claim 2, characterized in that the annular part (36) comprises a cylindrical end (48) which has a diameter less than that of the reaction disk (30) and guided in axial translation over an end of the thrust rod (32) which bears against the reaction disk.

5. The booster according to claim 4, characterized in that the thermal expansion element (48) is tubular and externally surrounds the thrust rod (32).

6. The booster according to claim 5, characterized in that the thermal expansion element (48) bears against the annular part (36) on the side facing the thrust rod (32).

7. The booster according to claim 4, characterized in that the thermal expansion element (48) is mounted inside a tubular part (52) of the thrust rod and is traversed axially by a finger (54) integral with the thrust rod and bears against the reaction disk (30).

8. The booster according to claim 7, characterized in that the thermal expansion element (48) is associated with a bearing element (58) which is mounted around the finger (54) between the thermal expansion element (48) and the annular part (36).

9. The booster according to claim 8, characterized in that the annular part (36) comprises another cylindrical end (40) for guiding the said plunger (28) in axial translation.

10. The booster according to claim 9, characterized in that the annular part (36) is made of spring steel.

* * * * *